United States Patent
Furuta

(10) Patent No.: US 8,279,804 B2
(45) Date of Patent: Oct. 2, 2012

(54) WIRELESS COMMUNICATIONS CONTROL METHOD, WIRELESS BASE STATION, AND WIRELESS TERMINAL

(75) Inventor: Daitarou Furuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 568 days.

(21) Appl. No.: 12/496,498

(22) Filed: Jul. 1, 2009

(65) Prior Publication Data

US 2009/0262687 A1    Oct. 22, 2009

Related U.S. Application Data

(63) Continuation of application No. PCT/JP2007/051599, filed on Jan. 31, 2007.

(51) Int. Cl.
 *H04W 4/00* (2009.01)
(52) U.S. Cl. ........................................ 370/328
(58) Field of Classification Search ............... 370/328, 370/335, 338, 252, 329, 317, 322, 341, 342; 455/522, 560, 561, 62, 63.1
See application file for complete search history.

(56) References Cited

U.S. PATENT DOCUMENTS

| 7,937,111 | B2 * | 5/2011 | Ishii et al. ................. 455/561 |
| 8,014,803 | B2 * | 9/2011 | Harada et al. .............. 455/509 |
| 2004/0125793 | A1 | 7/2004 | Yi et al. |
| 2007/0010268 | A1 | 1/2007 | Kim et al. |

FOREIGN PATENT DOCUMENTS

| JP | 2005529572 | 9/2005 |
| JP | 2006528453 | 12/2006 |

OTHER PUBLICATIONS

International Search Report dated May 15, 2007.
IEEE Std 802.16/2004 IEEE Standards for Local and metropolitan area networks, Part 16: Air Interface for Fixed Broadband Wireless Access Systems, IEEE Computer Society and the IEEE Microwave Theory and Techniques Society; Oct. 1, 2004.
IEEE Std 802.16e-2005 and IEEE Std 802.16-2004/Cor1-2005 IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1, IEEE Computer Society and the IEEE Microwave Theory and Techniques Society; Feb. 28, 2006.

* cited by examiner

*Primary Examiner* — Chi Pham
*Assistant Examiner* — Alexander O Boakye
(74) *Attorney, Agent, or Firm* — Murphy & King, P.C.

(57) ABSTRACT

The wireless base station sends control data relating to the processing, belonging to the upper layer (the second layer) of the first layer, to the wireless terminal through the downlink channel. Upon reception of the control data through the downlink data channel, the wireless terminal sends the response data, as a response to the control data, to the wireless base station through the control channel. The wireless base station detects the response data from the received data through the control channel, and then controls the processing belonging to the upper layer based on the response data. The above processing eliminates establishing a data channel to the wireless base station only for the response data as a response to the processing belonging to the upper layer.

16 Claims, 12 Drawing Sheets

WIRELESS COMMUNICATIONS CONTROL METHOD, WIRELESS BASE STATION, AND WIRELESS TERMINAL

CROSS-REFERENCE TO RELATED APPLICATION

This application is a continuation Application of a PCT international application No. PCT/JP2007/51599 filed on Jan. 31, 2007 in Japan, the entire contents of which are incorporated by reference.

FIELD

The embodiments discussed herein are related to a wireless communications control method, a wireless base station, and a wireless terminal.

BACKGROUND

Recently, the IEEE802.16WG (Working Group) has pursued the standardization and the development of a system called WiMAX, as an intermediate-distance large-amount wireless communications system, which WiMAX system employs the OFDMA (Orthogonal Frequency Domain Multiple Access) scheme that realizes flexible multiplexing to a wireless frame in the frequency axis direction and the time axis direction. In this instance, the IEEE802.16WG mainly regulates two types: IEEE802.16d (for example, see IEEE 802.16d-2004) intended for fixed communications use and particular, the latter technology can be called "mobile WIMAX").

These IEEE802.16d and IEEE802.16e (hereafter, these will be simply called "WIMAX standard" without distinguishing therebetween) regulate that a wireless terminal (MS: Mobile Station) performs communications between a BS (BS: Base Station) and the MS in obedience to MAP information contained in a wireless frame sent by the wireless base station.

That is, basically, the MS performs reception processing to a field called a burst which is specified with MAP information (DL-MAP) in a downlink (DL) sub-frame in a wireless frame expressed with the two dimensional region in the time axis (symbol time) direction and the frequency (frequency channel) direction, and also performs transmission processing by use of the burst specified with the UL-MAP, which is uplink MAP information. That is, the MAP information is regarded as information (burst allocation information) which specifies (allocates) the regions (reception region and transmission region) to be received and sent by the MS.

Here, as indicated in FIG. 8, in the wireless frame, both of (1) a control-system message and (2) user data are transmitted after addition of a MAC (Media Access Control) header thereto and conversion into a packet performed. That is, a GMH (Generic MAC Header) under the WiMAX standard having such a header format as is indicated in FIG. 9, is added to both of the control-system message and the user data. In this instance, in the following description, the term of "packet" means a MAC-SDU (Service Data Unit) (hereinafter, will be simply called "SDU") such as an IP (Internet Protocol) packet and an ATM (Asynchronous Transfer Mode) cell, and the MAC-SDU (payload area) with header information, such as a GMH and a sub-header, added thereto is called MAC-PDU (Protocol Data Unit) (or simply "PDU"). The PDU is a data unit coped with by the protocol of the packet.

Thus, no distinguishing is made between a control-system message (also called "MAC management data") and user data on the air, but in the BS or the MS, these are distinguished therebetween based on a connection identifier (CID) [a total of 16 bits (MSB 8 bits and LSB 8 bits, indicated by the diagonally shaded areas in FIG. 9)] set as the information element of the GMH.

That is, the CID is defined in advance as a CID indicating that it is a control-system message and a CID indicating that it is user data. For example, as a control-system message, three types of CID values (fixed values each added to each MS): the Basic CID; the Primary CID; and the Initial Ranging CID. As the CID of user data, a CID value called "Transport CID" is defined.

Therefore, the MS and the BS detects and analyzes the above mentioned GMH added to transceived data to confirm the CID, thereby making it possible to recognize whether the data is a control-system message or user data (that is, distinguish between a control channel and a data channel). In this instance, the type of the control-system message itself is identified by the type information (TYPE value) set to the management message type field [see FIG. 8(1)] of the payload area.

SUMMARY (1) According to an aspect of the embodiments, a method includes a wireless communications controlling method for use in a wireless communications system which performs communications by establishing a downlink data channel with a control channel, as processing belonging to a first layer, between a wireless base station and a wireless terminal, the wireless communications controlling method including: sending, by the wireless base station, control data relating to processing belonging to a second layer, which is an upper layer of the first layer, through the downlink data channel, sending, by the wireless terminal, response data in response to the control data to the wireless base station through the control channel, upon reception of the control data through the downlink data channel, detecting, by the wireless base station, the response data from the received data received through the control channel, and controlling, by the wireless base station, the processing belonging to the second layer based on the response data.

(2) According to an aspect of the embodiments, an apparatus includes a wireless base station which performs communications by establishing a downlink data channel with a control channel, as processing belonging to a first layer, between the wireless base station and a wireless terminal, the wireless base station including: a sending unit which sends control data relating to processing belonging to a second layer, which is an upper layer of the first layer, through the downlink data channel; a detecting unit which detects response data in response to the control data from the received data through the control channel; and a controlling unit which controls the processing belonging to the second layer based on the response data detected by the detection unit.

(3) According to an aspect of the embodiments, an apparatus includes a wireless terminal which performs communications by establishing a downlink data channel with a control channel, as processing belonging to a first layer, between the wireless terminal and a wireless base station, the wireless terminal including: a receiving unit which receives control data relating to processing belonging to a second layer, which is an upper layer of the first layer, through the downlink data channel; and a sending unit which sends response data in response to the control data through the control channel upon reception of the control data by the receiving unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the mobile wireless communications technology such as a mobile WiMAX system, it is proposed that the header compression techniques, such as ROHC (Robust Header Compression), PHS (Payload Header Suppression), ECRTP (Enhanced Compressed Real-time Transport Protocol, or the like, be applied thereto for the purpose of enabling efficient transmission of packets. These header compression techniques feature in dynamically switching the state according to the communications state of a wireless link (sate machine processing) and adaptively selecting appropriate header compression processing. In this instance, the details of the ROHC technique are defined in, for example, the RFC3095.

However, IEEE 802.16e-2005 gives no detailed regulations relating to header compression techniques, such as the ROHC, and the realization method thereof depends on implementation in the upper layer of the MAC layer. For this reason, no definition is made as to the feedback processing method for robust control or the like, and no definition is made, either, as to the control-system message type dedicated to the processing requested in application of the header compression technology such as the ROHC. That is, the present regulations are only on the assumption that the feedback processing requested in the header compression technology is performed in the upper layer (for example, convergence sublayer) of the MAC layer, and its specific implementation method is not regulated. In this instance, the term of "feedback" used here means uplink (UP) communications in the direction from the MS to the BS.

Although the WiMAX forum has been trying to determine such a specific implementation method (feedback method), the forum has been discussing only the method for identifying feedback data by means of holding and managing the CIDs relating to both of the downlink and the uplink user data in pairs at the time of generation of the service flow for user data, that is, at the time of DSA (Dynamic Service Addition) processing performed.

With this method, the BS and the MS establish a connection (UL connection) for use in feedback performed at the time of header compression processing (here the ROHC processing is a representative example) in addition to the DL connection used in normal DL user data transmission between the BS and the MS. Here, assuming that the UL connection for use in transmission of normal user data is used as the UL connection, the BS and the MS perform the connection establishment processing (with DSA processing) in which both the UL and DL connections are established for user data regardless of the present or the absence of UL user data of the MS. In that case, the BS and the MS operate in obedience to the sequences illustrated in, for example, FIG. 6A through FIG. 6C.

Figure 6A:
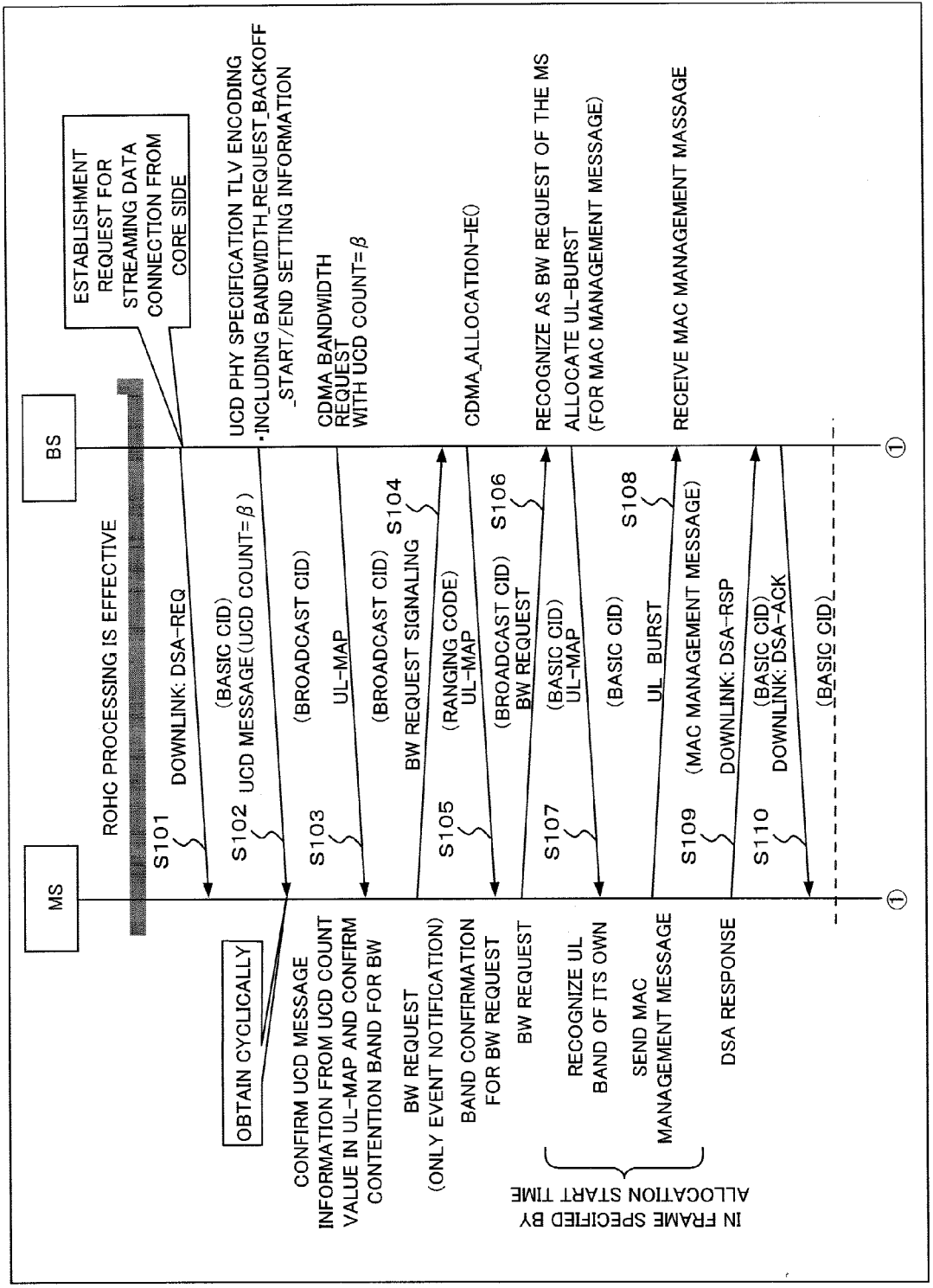
FIG. 6A is a sequence diagram for describing an operation of the WIMAX system.

That is, as illustrated in FIG. 6A, when a connection establishment request for DL user data (for example, streaming data) from the core network side to the BS is present, the DL DSA processing is performed, in the beginning, between the BS and the MS (step S101 through step S110).

In more details, the BS sends a DL DSA (Dynamic Service Addition) request (DSA-REQ) message (a control-system message of CID=Basic CID) to the MS. Upon reception of the DSA-REQ message, the MS uses the contention region (band width) to request the BS to allocate the DL band width (BM: Band Width), with a DL band width request message (control-system message) by using the contention region (band width) (issuance of BW request signaling). In this instance, the terms of "contention region" means a UL burst in the wireless frame shared by more than one MS, and is identified by means of confirming the contents (message information) of the UCD message cyclically issued (broadcasted) from the BS, based on the UCD (Uplink Channel Descriptor) count value ($\beta$) in the MAP information (UL-MAP) broadcasted from the BS.

Upon normal reception of the BW request signaling, the BS allocates a CDMA code (ranging code=a random value of 1 through 256) which identifies the MS and parameters (information elements: IE) such as information relating to a UL band width (UL burst), which is used for the MS to make a band width request (control-system message), to the MS with UL-MAP, and then permits UL data transmission in obedience to the UL band width request of the MS (broadcasts a CDMA_Allocation-IE message).

Upon reception of the permission, the MS sends a band request message and a DSA response (DSA-RSP) message, which are control-system messages (CID=Basic CID), to the BS by use of the allocated UL burst (that is, the transmission region of a control-system message). Then, upon normal reception of the band width request message, the BS sends a DSA confirmation (DSA-ACK) message, as the response thereto, to the MS.

The above described sequence makes the DL DSA processing to be completed, and the DL user data connection is established.

Figure 6B:
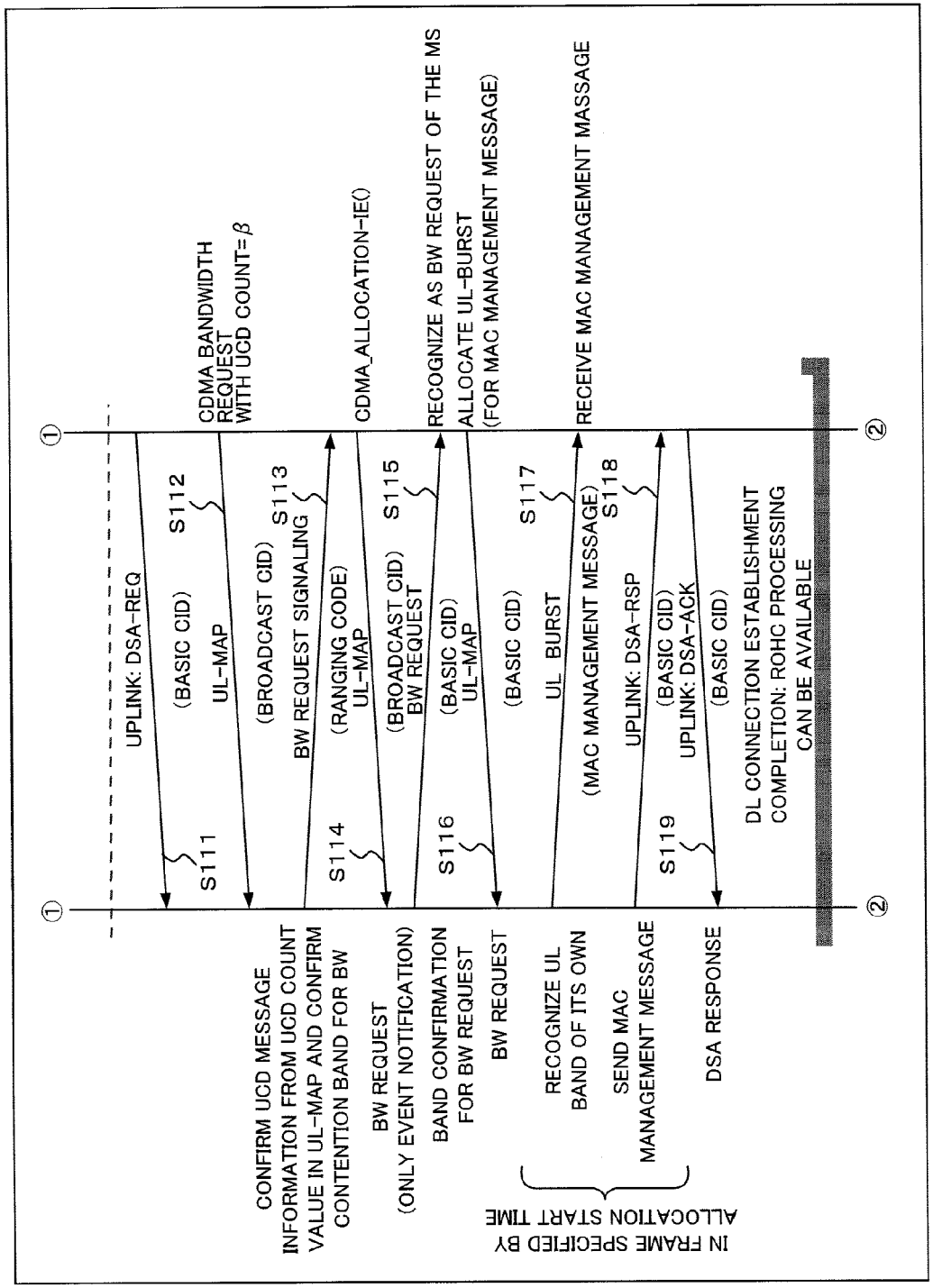
FIG. 6B is a sequence diagram for describing an operation of the WiMAX system.

Next, as illustrated in FIG. 6B, the BS executes the UL DSA processing for establishing the UL connection (feedback connection) between the BS and the MS for use in feedback performed at the time of the ROHC processing (from step S111 through step S119).

That is, the BS sends a UL DSA-REQ message to the MS. Upon reception of the DSA-REQ message, the MS requests allocation of an UL band width by using a contention region similarly to the case of the DL connection. Then, upon normal reception of the request, the BS permits the MS to transmit a UL band width request with UL-MAP. Upon reception of the permission, the MS sends a UL band width request message and a DSA response (DSA-RSP) message by using the allotted UL burst. Upon normal reception of the band width request message, the BS sends a DSA acknowledgment (DSA-ACK) message, as a response thereto, to the MS.

The above described sequence makes UL DSA processing to be completed, and connections for both of DL user data and UL user data are established. That is, the feedback (transmission of the ROHC feedback packet) at the time of ROHC processing becomes available through the UL user data connection.

Figure 6C:
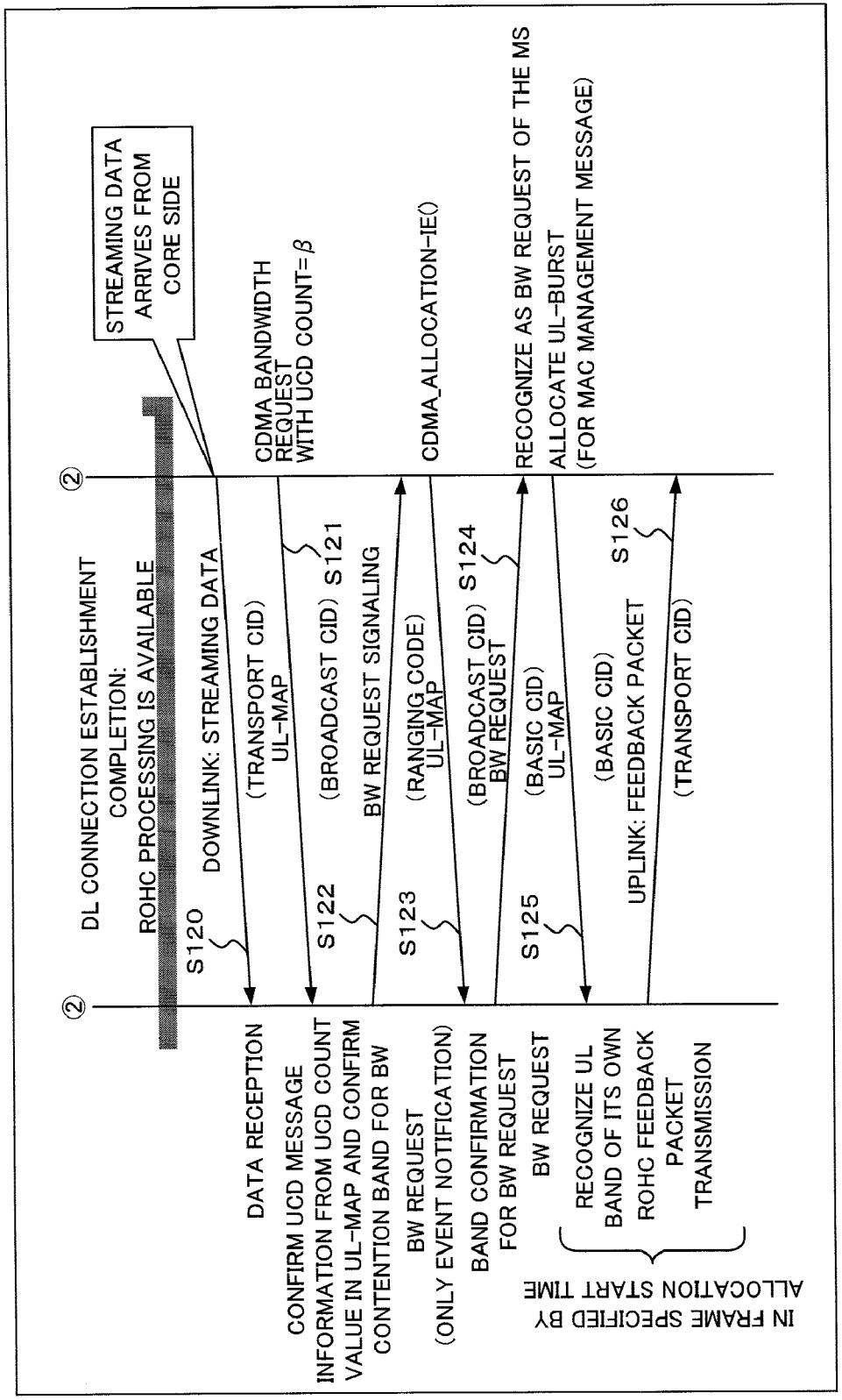
FIG. 6C is a sequence diagram for describing an operation of the WiMAX system.

After that, as illustrated in FIG. 6C, when user data (streaming data) arrives at the BS from the core network end, the subject data is added thereto with the GMH including the CID=Transport CID by the BS, and is then sent to the MS through the DL connection established in such a manner as is described above (step S120).

Here, when the ROHC processing is effective, if the ROHC packet sent from the BS through the DL connection of the user data is received by the MS, it is used for the MS to notify the BS of information (ACK/NACK) which becomes the index for selecting (shifting) the header compression processing (state) on the sender end (BS) according to the reception state (for example, a result of comparison between the header information normally received and held previously and the header information newly transmitted) to the BS with the above mentioned feedback packet. In this instance, there are three types of header compression processing states: the IR (Initialization and Refresh) state; the FO (First Order) state; and the SO (Second Order) state. In the IR state, the header compression is not performed, and all the header fields are sent. In the FO state, only the fields which dynamically change are updated (sent). In the SO state, only the predetermined minimum field is updated (sent) since the communications state is stable.

At that time, the already established user data UL connection can be used, but for realizing efficient use of wireless band widths, control of allocating unused band widths of the UL connections operates on the BS end after reception of the band width request from the MS.

In such a case, when it is used for the MS to practically send user data (feedback packet), the MS needs to execute the above described UL DSA processing once again to secure a band width. For this reason, while receiving user data through the DL connection, the MS requests allocation of a UL band width once again using the UL contention area specified by the UL-MAP from the BS, and the BS allocates a UL band width (UL burst) to the MS according to the request with the UL-MAP (step S121 through step S125).

These processes make it possible for the MS to send a feedback packet of the ROHC processing by use of the UL burst allocated by the UL-MAP (step S126).

Figure 7:
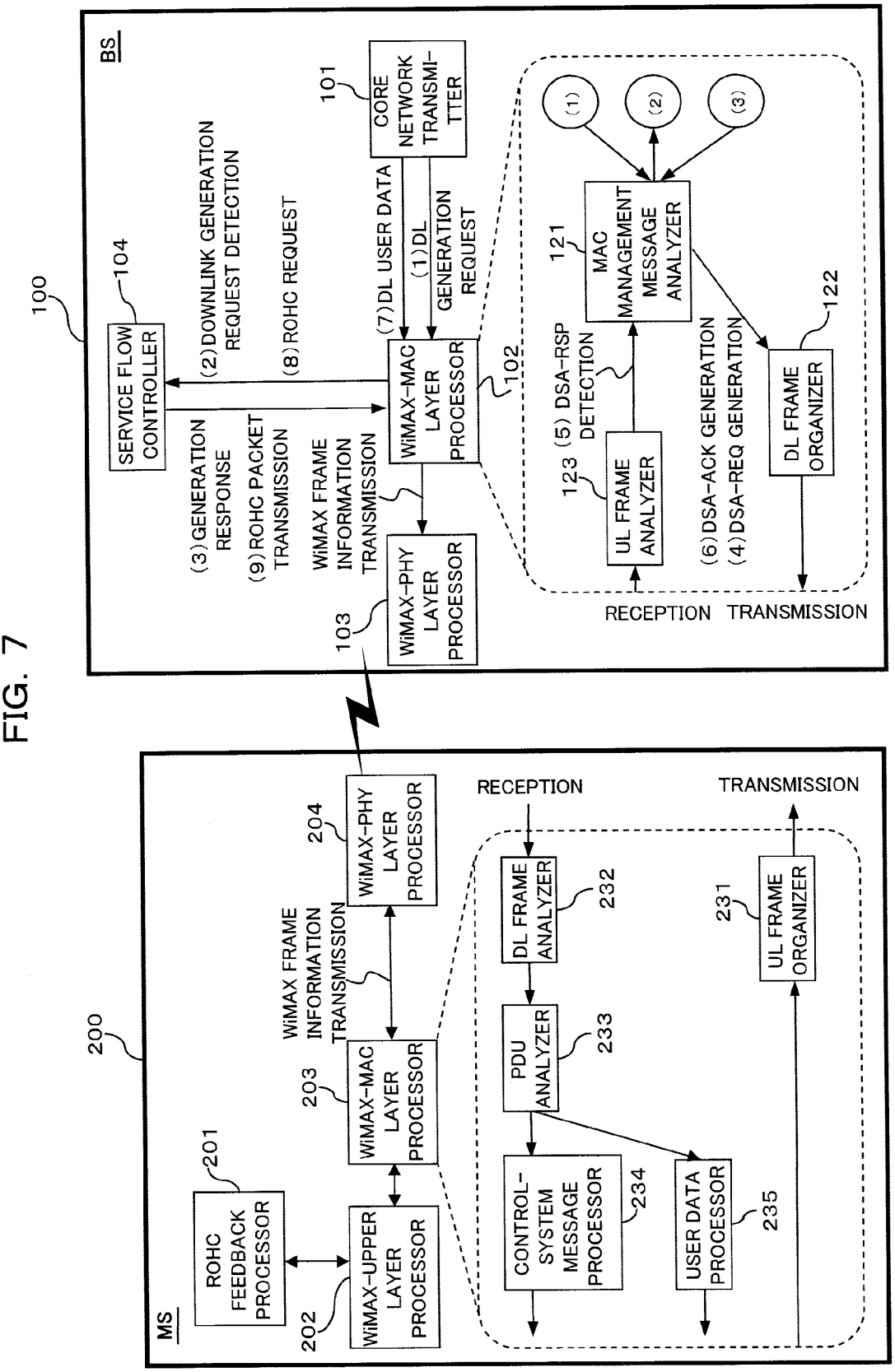
FIG. 7 is a block diagram illustrating a WiMAX system which realizes the sequences indicated in FIG. 6A through FIG. 6C.
Figure 8:
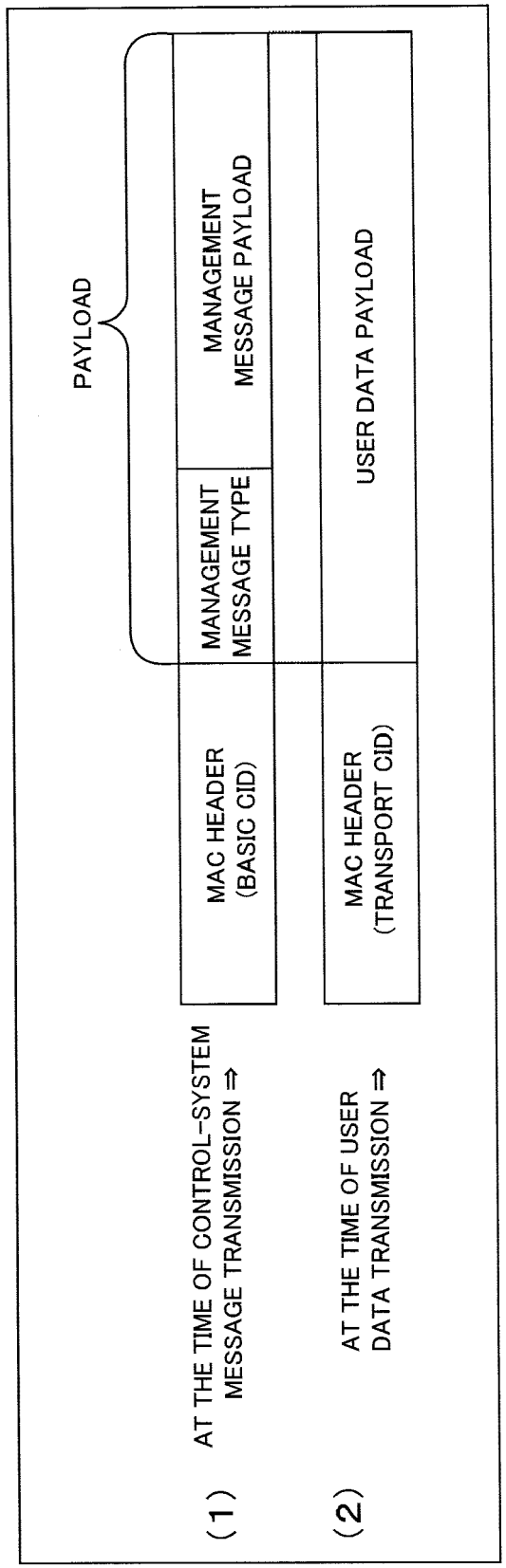
FIG. 8 is a diagram illustrating a packet format in conformity with the WiMAX standard.
Figure 9:
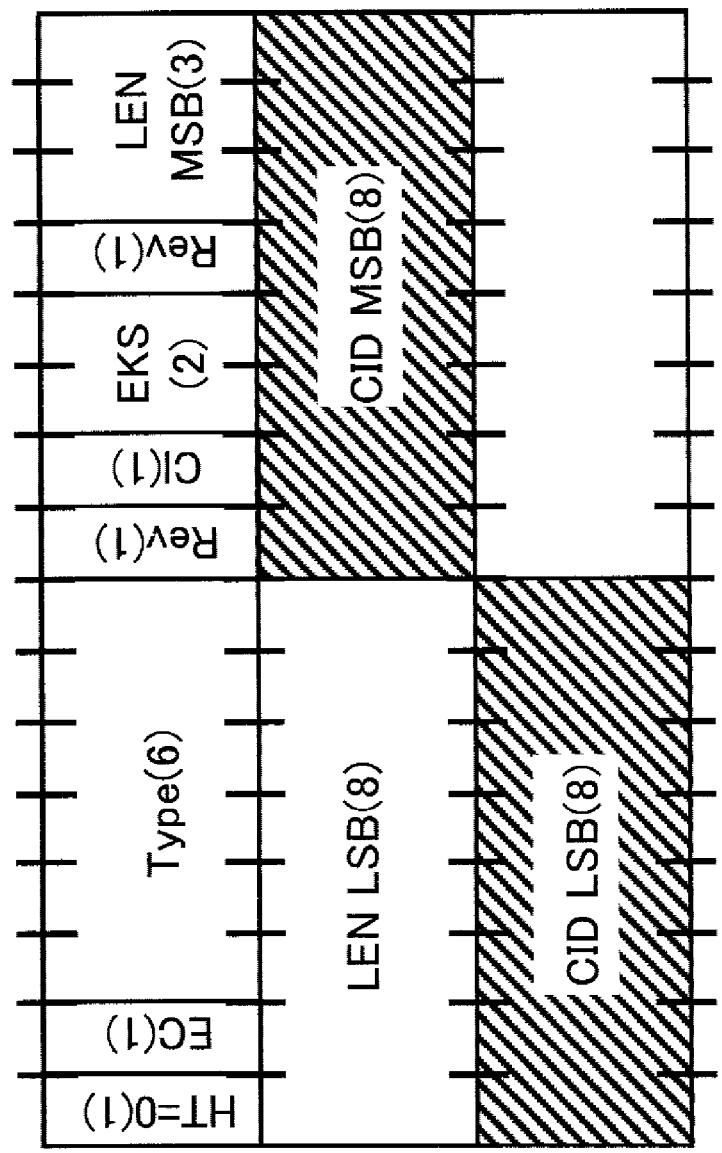
FIG. 9 is a diagram illustrating a MAC header (GMH) format in conformity with the WiMAX standard.

As a construction of the BS and the MS for realizing the above described sequence, such a construction as is illustrated in FIG. 7 can be considered. That is, with an attention paid to the function of each of the important part thereof, the BS 100 includes: a core network transmitter 101; a MAC management message analyzer 121; a WiMAX-MAC layer processor 102 having a downlink (DL) frame organizer 122 and an uplink (UL) frame analyzer 123; a WiMAX-PHY (physical) layer processor 103; and a service flow controller (ROHC feedback processor) 104. The MS 200 includes: an ROHC feedback processor 201; a WiMAX-upper layer processor 202; a WiMAX-MAC layer processor 203 having a UL frame organizer 213, a DL frame analyzer 232, a PDU analyzer 233, a control-system message processor 234, and a user data processor 235; and a WIMAX-PHY (physical) layer processor 204.

In the BS 100 with the above described construction, when user data (DL data) destined to the MS 200 arrives from a core network (not illustrated) such as an IP network and an ATM network, the core network transmitter 101 transmits a DL generation request to the WiMAX-MAC layer processor (hereafter, will be simply called the "MAC layer processor") 102 (1), and the MAC layer processor 102 (MAC management message analyzer 121) detects the DL generation request (2).

Upon recognition of the detection of the DL generation request, the service flow controller 104 responds to the MAC layer processor 102 (MAC management message analyzer 121) with the generation of the DSA-REQ message (3). In response to this, the MAC management message analyzer 121 instructs the DL frame organizer 122 to generate and send a DSA-REQ message (4). With this, the DSA-REQ message is sent to the MS 200.

When the MS 200 receives the DSA-REQ message, the DSA-REQ message is transmitted to the WIMAX-MAC layer processor 203 by way of the WiMAX-PHY (physical) layer processor (hereafter, will be simply called the "physical layer processor") 204. In the WiMAX-MAC layer processor 203, the DL frame analyzer 232 and the PDU analyzer 233 analyze the DL frame and the PDU, respectively, to distinguish between a control-system message and user data, and then, a control-system message is transmitted to the control-system message processor 234, and user data is transmitted to the user data processor 235.

Then, the control-system message processor 234 identifies the received message as a DSA-REQ message based on the type information set to the management message type field, and notifies the WiMAX-upper layer processor (hereafter, will be simply called the "upper layer processor") 202 of the identification information. Upon reception of the notification, the upper layer processor 202 generates the contents of the DSA-RSP message at the time of completion of the series of negotiation processes for realizing DL connection establishment in the MAC layer, which series of negotiation processes is performed by the WiMAX-MAC layer processor 203, and sends the generated result to the WiMAX-MAC layer processor 203.

The DSA-RSP message contents are mapped to the UL burst of the UL frame specified by the UL-MAP after being converted into a packet (PDU), and then sent to the BS 100 by the UL frame organizer 231 of the MAC layer processor 203.

The UL frame (DSA-RSP message) is transmitted to the MAC layer processor 102 by way of the WiMAX-PHY layer processor 103 of the BS 100, and its contents (type information) are analyzed by the UL frame analyzer 123, and the control-system message (DSA-RSP message) is then detected (5). After that, the DSA-RSP message is transmitted to the MAC management message analyzer 121, which performs the processing corresponding to the contents of the message. That is, in a case of a DSA-RSP message, a DSA-ACK message is generated as a response thereto (6). This is mapped to the DL burst of the DL sub-frame specified with the DL-MAP in the DL frame organizer 122 and then sent back to the MS 200.

In this manner, the sequence of step S101 through step S110 described above with reference to FIG. 6A is executed between the BS 100 and the MS 200. As a result, a DL user data connection is established by means of transceiving control-system messages through the control-system message connection.

In this instance, in the sequence for UL connection establishment thereafter, also, transceiving of the control-system messages is basically performed by means of the processing similar to the above. That is, the control-system messages and the MAP information to the MS 200 are generated by the ROHC feedback processor 104 and the MAC layer processor 102 (DL frame organizer 122) of the BS 100, and the control-system messages to the BS 100 are generated by the upper layer processor 202 and the WiMAX-MAC layer processor 203 (UL frame organizer 231).

Then, when the state in which the ROHC processing can be performed is realized, in the BS 100, the service flow controller 104 generates an ROHC packet and then transmits the generated ROHC packet to the MS 200 by way of the WIMAX-PHY layer processor 103 by use of the established DL connection (the DL burst of a DL sub-frame) [see (9) in FIG. 7].

However, in the above described sequence processing, when the service flow generation processing (DSA processing) is used for DL, for example, when the upper layer processing (header compression processing such as the ROHC processing) requests feedback processing (UL data transmission processing) even in a case, for example, where the MS 200 needs only to simply receive streaming data, the DSA processing may be performed in both of DL and UL without failing for securing the user data connection band width in the inverse direction (UL), so that it is impossible to efficiently use the band width (wireless resources) between the BS 100 and the MS 200.

Further, that a UL service flow is generated (constructed), in other words, that a UL connection may also be established, leads to increase in information amount (construction information context) which may be held in the BS 100 and the MS 200. This causes the waste of the memories of the BS 100 and the MS 200 and also complication of database management [Basic CID, UL CID (for user data), controlling of the MAP information of the DL CID (dedicated to feedback), or the like].

Yet further, in a case where feedback is processed in the upper layer, there is a possibility that user data transmission, which demands prompt processing, delays, resulting in lowering of the throughput.

The embodiments are proposed in consideration of the above described issues. One of the purposes of the embodiments are to eliminate establishing an inverse-direction (UL) user data connection only for the response data in response to the control-system data sent by use of the DL user data connection in the processing belonging to the upper layer of the MAC layer such as the header compression processing.

In this instance, without being limited to the above purpose, it is another object of the embodiments to realize the effects and the benefits that cannot be obtained by the previous techniques, which effects and benefits are induced by each construction in the embodiments which will be described later.

In order to accomplish the above objects, the embodiments feature in that the following wireless communications controlling method, the wireless base station, and the wireless terminal, are used.

An embodiment will now be described with reference to the relevant accompanying drawings. Here, the embodiments should by no means be limited to the above-illustrated embodiment, and various changes or modifications may be suggested without departing from the gist of the invention.

(A) Overview Description

In order to resolve the above described issues, one preferred embodiment which will be described below performs the following. When transmitting a packet which requests header compression processing such as ROHC processing belonging to the upper layer (the second layer) of the MAC layer (the first layer) in DL with a DL user data connection (that is, DL data channel), a response (feedback packet) to the packet is sent from the MS in UL by use of the CID set to the GMH of a control-system message (control data), and the BS detects the feedback packet as a control-system message (that is, reception data of the control channel).

That is, the BS is made to be able to distinguish between defined processing, such as user data packet processing and MAC management message processing, under the WiMAX standard and packet processing accompanying the header compression processing. At the time of the above distinguishing performed, a CRC arithmetic operation, for example, is used for distinguishing the above processing from a control-system message defined under the WiMAX. In this instance, the following description will be made using the ROHC processing as a representative example of header compression processing. Further, communications between the BS and the MS is assumed to be performed with a wireless frame (OFDM frame or OFDMA frame) in conformity with the WiMAX standard.

(B) One Preferred Embodiment

Figure 1:
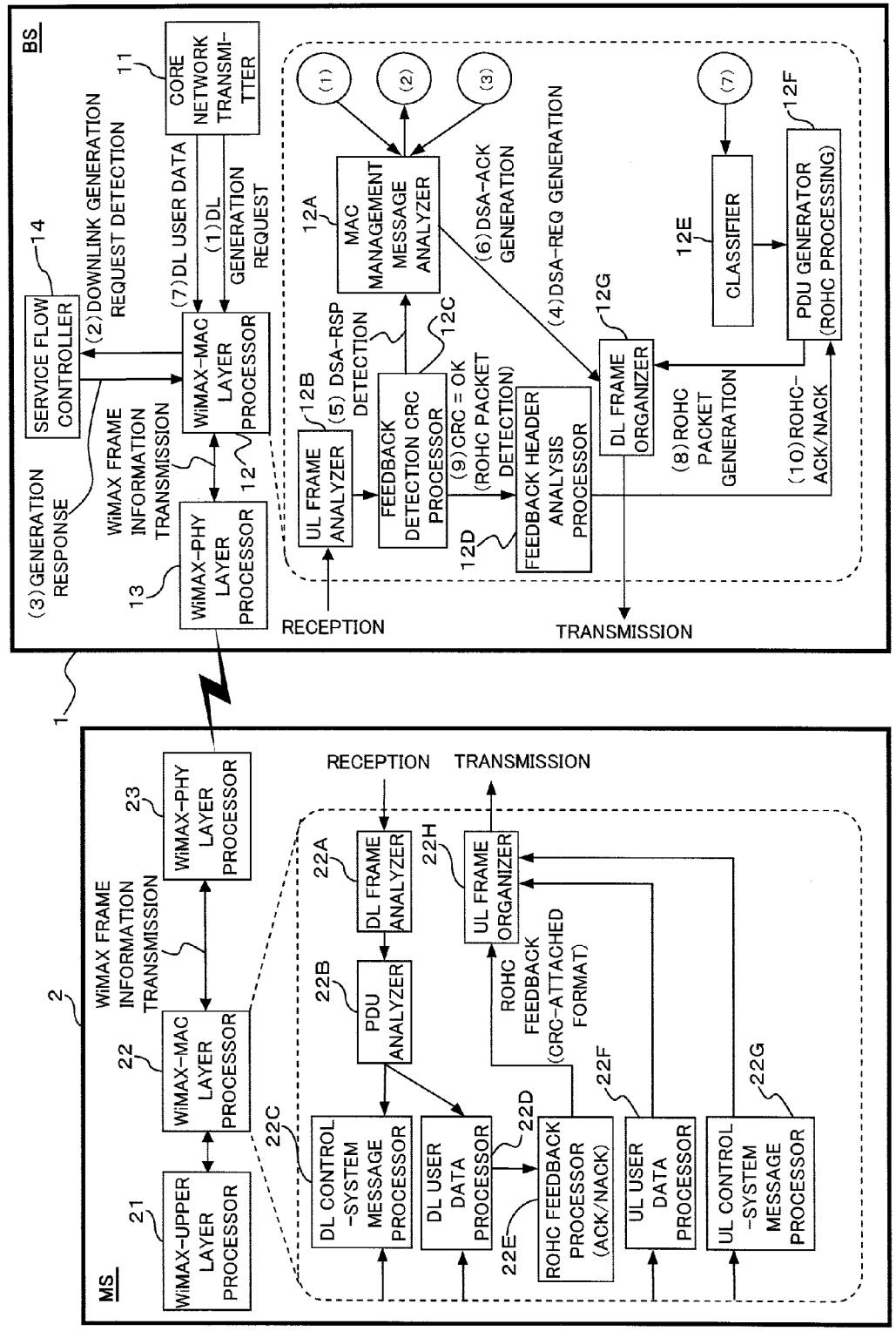
FIG. 1 is a block diagram illustrating a construction of a WiMAX system as a wireless communications system according to one preferred embodiment.

FIG. 1 is a block diagram illustrating a construction of a WiMAX system as a wireless communications system according to one preferred embodiment of the embodiments. The WiMAX system depicted in FIG. 1 has one or more BSs 1 and one or more MSs 2. With an attention paid to the important parts thereof, the BS 1 includes: a core network transmitter 11; a WiMAX-MAC layer processor (MAC layer processor) 12; a WiMAX-PHY layer processor (physical layer processing unit) 13; and a service flow controller 14, while the MS 2 includes: a WiMAX-upper layer processor (upper layer processing unit) 21; a WiMAX-MAC layer processor (MAC layer processing unit) 22; and a WiMAX-PHY layer processor (physical) 23.

(Functions of BS 1)

Here, in the BS 1, the core network transmitter 11 transmits the DL user data and a control message received from a core network, such as an IP network and an ATM network, to the MAC layer processor 12. This MAC layer processor 12 may originally be in charge of the processing belonging to the MAC layer, such as generation/restoration of a network entry and a PUD, connection management, and scheduling of UL bursts and DL bursts. According to the present example, however, it is possible to perform processing relating to ROHC that includes at least detection of a ROHC packet (feedback packet) received from the MS 2 as one of the control messages, in addition to the MAC layer processing. That is, this MAC layer processor 12 has a function of performing a part of the processing belonging to the upper layer (convergence sub-layer), such as the header compression processing, which does not originally belong to the MAC layer.

The physical layer processing unit 13 performs processing that includes the processing belonging to the WiMAX physical layer (the lower layer of the MAC layer) such as transceiving of an OFDM-based frame and an OFDMA-based wireless frame, multi-level modulation and demodulation such as QPSK, 16QAM, 64QAM, and encoding/decoding (CODEC) of an error correction code such as a convolution code and a turbo code.

Further, as illustrated in FIG. 1, the MAC layer processor 12 further includes: a MAC management message analyzer 12A; a UL frame analyzer 12B; a feedback detection CRC processor 12C; a feedback header analyzer 12D; a classifier 12E; a PDU generator (ROHC processor) 12F; and a DL frame organizer 12G.

The MAC management message analyzer 12A analyzes the message contents (the above mentioned management message type) of the control-system message from the service flow controller 14 or the feedback detection CRC processor 12C, and then, in accordance with the thus obtained analysis result, transmits a message destined to the MS 2 and a massage destined to itself (BS 1) to the DL frame organizer 12G and to the service flow controller 14, respectively.

The UL frame analyzer 12B has functions of analyzing a UL frame (GMH) received from the MS 2 to distinguish between a control-system message and user data and then transmitting a control-system message to the feedback detection CRC processor 12C.

Figure 2:
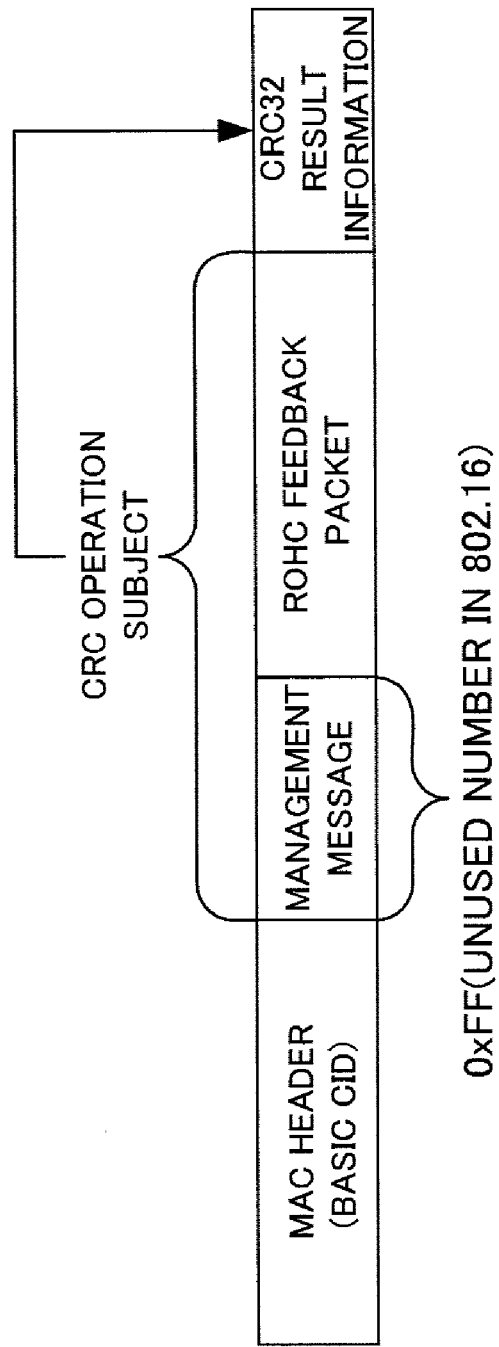
FIG. 2 is a diagram illustrating an example of a feedback packet format for use in the system depicted in FIG. 1.

As is indicated in FIG. 2, the feedback detection CRC processor 12C performs a CRC arithmetic operation to a payload field, with the exception of the GMH of the control-system message transmitted from the UL frame analyzer 12B, thereby distinguishing between an ROHC processing feedback packet and a control-system message defined under another WiMAX standard. In this manner, the feedback detection CRC processor 12C detects a feedback packet sent from the MS 2 as one of the control-system messages. That is, the BS 1 receives an uplink packet from the MS 2. As a result of the analysis, if the Basic CID is used and also if the CRC arithmetic operation result is "OK", the BS 1 recognizes that the received uplink packet is a ROHC feedback packet.

Figure 3:
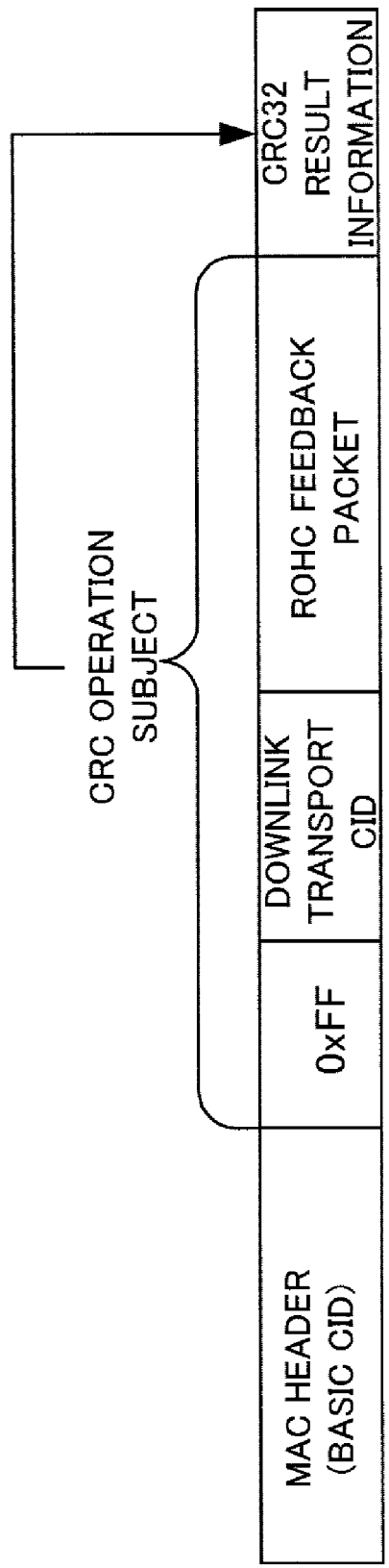
FIG. 3 is a diagram illustrating another example of a feedback packet format for use in the system depicted in FIG. 1.

The feedback header analysis processor (detection protection unit) 12D checks the management message type of the control-system message (that is, a feedback packet) detected by the feedback detection CRC processor 12C, thereby evaluating whether or not the control message includes a feedback packet. In the present example, in a case where the management message type is set (masked) to "0xFF" (unused type information other than the type information defined under the WIMAX standard) as indicated in FIG. 3, the feedback header analyzer 12D confirms that the thus detected control-system message is a control-system message including a feedback packet.

That is, after confirmation of the CRC arithmetic operation result, the management message type field is confirmed once again. This makes it possible to improve the accuracy of detection of a feedback packet while avoiding a possibility of an erroneous recognition caused by the use of the CRC, thereby realizing a stable operation. In this instance, even if an attempt is made contrarily by the feedback header analyzer 12D such that it erroneously recognizes the feedback packet as a control-system message due to bit inversion caused by quality deterioration on the air, the contents therebetween do not match, so that there is a possibility that the feedback packet is discarded. However, even though a single feedback packet is discarded, a state transition is caused by the function of the ROHC, only resulting in release of the compression given to the MAC header, so that no problem is caused.

In other words, the feedback detection CRC processor 12C and the feedback header analyzer 12D function as a detecting means which detects a feedback packet (response data) to an ROHC packet, which is control data to the MS 2), from the received data of a UL connection (that is, control channel) for a control-system message.

The classifier 12E has a function of classifying the user data (IP packet, Ethernet frame, ATM cell, or the like) received from a core network according to the various types of support services such as VoIP, streaming, HTTP, and e-mail. This function of the classifier 12E can be implemented on the upper layer (convergence layer) together with the ROHC processing function. In the present example, however, at least a part of the above mentioned function is implemented in the MAC layer processor 12 as preparation processing for ROHC processing on the MAC layer.

The PDU generator (ROHC processor) 12F generates a PDU (including a ROHC packet) according to the classification performed by the classifier 12E. The PDU generator 12F also has a function of maintaining or effecting a transition (that is, state machine processing) of the state of the ROHC processing of its own according to the processing result obtained by the feedback header analyzer 12D, that is, whether the received feedback packet is ACK (ROHC-ACK) or NACK (ROHC-NACK). In other words, the PDU generator 12F has a function as a controlling means which controls the processing belonging to the upper layer of the MAC layer based on a feedback packet detected by the feedback detection CRC processor 12C and the feedback header analyzer 12D.

The DL frame organizer 12G maps the PDU (including an ROHC packet) thus generated by the PDU generator 12F to the DL burst of the DL sub-frame and then sends the result to the MS 2. That is, the DL frame organizer 12G has a function as a sending means which sends an ROHC packet, which is control data relating to the processing belonging to the upper layer of the MAC layer, to the MS 2 with the DL connection for user data (data channel).

(Function of MS 2)

On the other hand, the upper layer processor 21 of the MS 2 performs processing belonging to the upper layer of the MAC layer; for example, processing belonging to the convergence sub-layer such as convergence processing of an IP packet, an Ethernet frame, and an ATM cell. The MAC layer processor 22 is originally in charge of performing processing belonging to the convergence sub-layer, for example, processing such as generating/restoring a network entry and the PDU, connection management, scheduling of the UL bust and the DL burst. In the present example, however, the upper layer processor 21 is capable of, in addition to the MAC layer processing, at least generating an ROHC packet (feedback packet) including information (ROHC-ACK/NACK) that becomes the transition index of the ROHC processing (state machine processing) performed in the BS 1 and the ROHC processing including sending the packet to the BS 1 as a control-system message. That is, this MAC layer processor 22, similar to the BS 1 end, has a function of performing a part of the processing belonging to the upper layer (convergence sub-layer), which processing does not originally belong to the MAC layer.

Similar to the physical layer processing unit 13 on the BS 1, the physical layer processor 23 performs processing that includes the processing belonging to the WiMAX physical layer, which is the lower layer of the MAC layer; for example, transceiving of an OFDM-based wireless frame and an OFDMA-based wireless frame, multi-level modulation and demodulation such as QPSK, 16QAM, and 64QAM, and CODEC of an error correction code such as a convolution code, and a turbo code.

Further, in order to realize the ROHC processing in the above mentioned MAC layer, with an attention paid to the function of the important part thereof, the MAC layer processor 22, as illustrated in FIG. 1, includes, for example: a DL frame analyzer 22A; a PDU analyzer 22B; a DL control-system message processor 22C; a DL user data processor 22D; a ROHC feedback processor 22E; a UL user data processor 22F; a UL control-system message processor 22G; and a UL frame organizer 22H.

Here, the DL frame analyzer 22A has a function of analyzing the DL/UL-MAP, the DCD (Downlink Channel Descriptor), and the UCD (Uplink Channel Descriptor) set to the header field of the received DL frame from the BS 1, thereby identifying the DL burst and the UL burst allocated from the BS 1. The PDU analyzer 22B has a function of evaluating whether the received PDU is a control-system message or user data based on the CID set to the CID field of the PDU received by the thus identified DL burst, and then transmits (distributes) the control-system message and the user data to the DL control-system message processor 22C and the DL user data processor 22D, respectively.

The DL control-system message processor 22C has a function of analyzing the message contents of the control-system message (SDU) and then performing control (for example, connection management, control of the DSA, or the like) according to the contents; the DL user data processor 22D has a function of performing processing (SDU extraction) to the user data (including the ROHC packet) transmitted from the PDU analyzer 22B and then transmitting the ROHC packet and the other user data to the ROHC feedback processor 22E and the upper layer processor 21, respectively.

The ROHC feedback processor (CRC processor, classification information setting unit) 22E generates a feedback packet to be sent (replied) to the BS 1 in response to an ROHC packet when the ROHC packet is transmitted from the DL user data processor 22D. In the present example, as indicated in FIG. 2, the ROHC feedback processor 22E sets the Basic CID, which indicates that the subject message is a control-system message, to the CID field of the MAC header, and also stores an ROHC feedback packet in the payload area, and then adds the result obtained by the CRC arithmetic operation of each of the fields except the MAC header, thereby generating a feedback packet.

In this instance, as to the arithmetic operation formula of the CRC arithmetic operation is no object; FIG. 2 exemplifies a case where a 32-bit CRC arithmetic operation is applied. Further, as indicated in FIG. 3, the CID (Transport CID) of the DL user data connection (data channel) can be given to the payload field following the management type field. In this case, the ROHC feedback processor 22E has a function as a downlink channel identification information adder, which sends a feedback packet with the identification information (Transport CID) included therein, so that the BS 1 (ROHC processor 12F) becomes capable of easily recognizing for which service flow (user data of the DL connection) the received feedback packet is, based on the CID.

For example, when the ID for managing the ROHC processing (state machine processing) and the CID (Transport CID) of the DL user data connection are managed in a database (not illustrated) in association with one another for each service flow (SF) in the BS 1, it becomes possible to directly obtain information used for state machine processing and service flow expansion from the database at high velocity by no way of needless processing such as CID conversion or the like, based on the Transport CID given to the feedback packet. Here, it is also possible to construct and manage a database in which the Transport CID and the Basic CID are associated with one another, thereby making it possible to confirm the corresponding Transport CID in the database based on the Basic CID of the feedback packet.

The UL user data processor 22F has a function of transmitting user data, which is to be sent to the BS 1 after processing (conversion into PDU) performed thereto, to the UL frame organizer 22H; the UL control-system message processor 22G has a function of transmitting a control-system message after processing (conversion into PDU) performed thereto, to the UL frame organizer 22H.

Further, the UL frame organizer 22H has a function of mapping the PDU (including a feedback packet) generated by each of the above mentioned elements 22E, 22F, and 22G to the UL bursts of the UL sub-frame allocated by the BS 1 with the UL-MAP and then sending the result to the BS 1.

That is, the above DL user data processor 22D functions as a receiving means which receives control data (ROHC packet) relating to the processing (ROHC processing) belonging to the upper layer of the MAC layer from the BS 1 with the DL data channel; the UL frame organizer 22H functions as a sending means which sends a feedback packet to the BS 1 with the UL control-system message connection (control channel) in response to an ROHC packet when the receiving means receives the ROHC packet.

(Operation of BS 1)

Hereinbelow, referring to the flowchart illustrated in FIG. 4, a description will be made of an operation with an attention paid to the BS 1 (in particular, UL reception processing performed after sending an ROHC packet to the MS 2) in the WiMAX system according to the present embodiment having the above described construction.

When starting reception of a UL wireless frame, the BS 1 executes analysis processing of the wireless frame (step S1). That is, in the MAC layer processor 12, the UL frame analyzer 12B checks whether or not the Basic CID is given to the CID field of the GMH, thereby checking whether or not the PDU of the received frame is a control-system message (MAC management message) (step S2).

As a result, when the PDU is not a MAC management message, the MAC layer processor 12 performs requested user data processing to an SDU since user data is mapped to the PDU as the SDU (from No route of step S2 to step S3). On the other hand, when the PDU is a MAC management message, the message is transmitted to the feedback detection CRC processor 12C, and then, as already described with reference to FIG. 2 or FIG. 3, a CRC arithmetic operation is performed to a part of a payload field to be subjected to the CRC arithmetic operation (from Yes route of step S2 to step S4).

When the CRC arithmetic operation result is "OK", the feedback detection CRC processor 12C transmits the received message to the feedback header analyzer 12D since there is a possibility that the received massage is a control-system message. The feedback header analyzer 12D checks whether or not the management type field of the transmitted message is masked as "0xFF" (from Yes route of step S5 to step S6). If the checking result is positive, the feedback detection CRC processor 12C decides that the message is a feedback packet in the ROHC processing and then transmits the received message to the feedback header analyzer 12D (Yes route of step S6). Here, if the Transport CID is given to the payload area, identification is made as to for which DL user data (SF) the received feedback packet is.

After that, the above feedback packet is transmitted to the feedback header analyzer 12D and is then subjected to header analysis processing performed therein. This makes it possible to distinguish between a ROHC-ACK and a ROHC-NACK (step S7 and step S8). As a result, if the distinguished result is a ROHC-NACK, it can be decided that wireless circumstances between the BS 1 and the MS 2 is deteriorated. Therefore, the PDU generator (ROHC processor) 12F executes state machine processing, in which the ROHC state of the BS 1 is shifted into the FO state (or maintained), thereby changing (or maintaining) the header compression ratio of the PDU to be generated into a low compression ratio (from Yes route of step S9 to step S10).

On the other hand, if the feedback packet is ROHC-ACK, it can be decided that wireless circumstances are fine (stable). Therefore, the PDU generator (ROHC processor) 12F executes state machine processing in which the ROHC state is shifted (or maintained) into the SO state, thereby changing (or maintaining) the header compression ratio of the PDU to be generated into a high compression ratio (from No route of step S9 to step S12).

In this instance, if the CRC arithmetic result is "NG" in the above mentioned step S5, and also, if the management type field is not masked in the step S6, the control-system message can be decided not to be a feedback packet but to be a control-system message (DSA-RSP message or the like) defined under the WiMAX standard. Thus, the control-system message is then transmitted to the MAC management message analyzer 12A, and is subjected to the MAC management message processing (generation of a DSA-ACK message or the like) corresponding to the classification information thereof (from No route of step S5 or step S6 to step S1).

As already described above, if a CID (Basic CID) which indicates that the packet received from the MS 2 with a UL frame is a control-system message is used in the MAC header of the thus received packet and also if the result of the CRC arithmetic operation performed to the payload area is "OK", the BS 1 recognizes that the received packet is a feedback packet of the ROHC processing and is capable of executing the ROHC state machine processing corresponding to the contents (ACK/NACK) thereof in the MAC layer.

(Operation of WiMAX System)

Figure 5A:
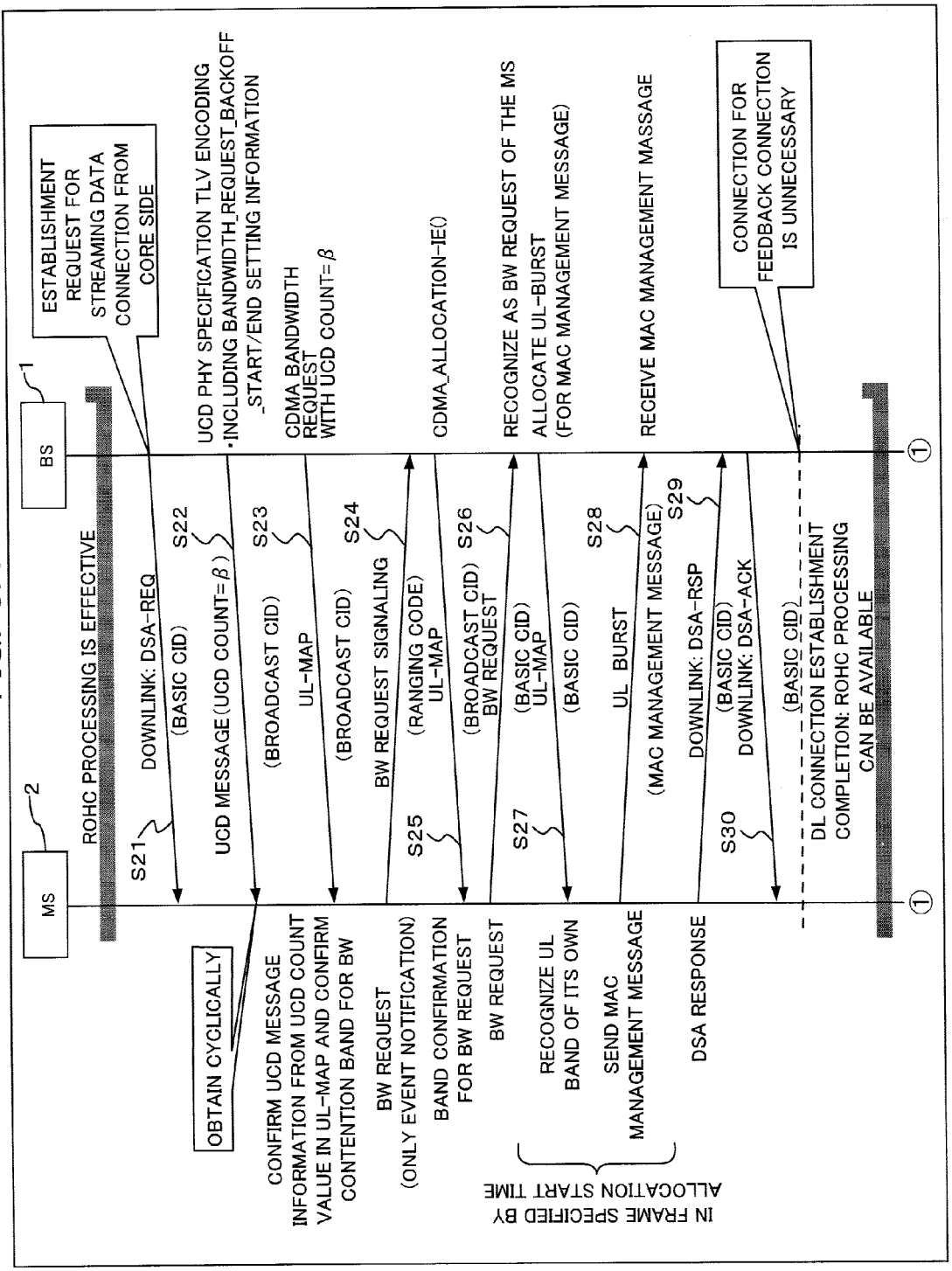
FIG. 5A is a sequence diagram for describing an operation of the system depicted in FIG. 1.
Figure 5B:
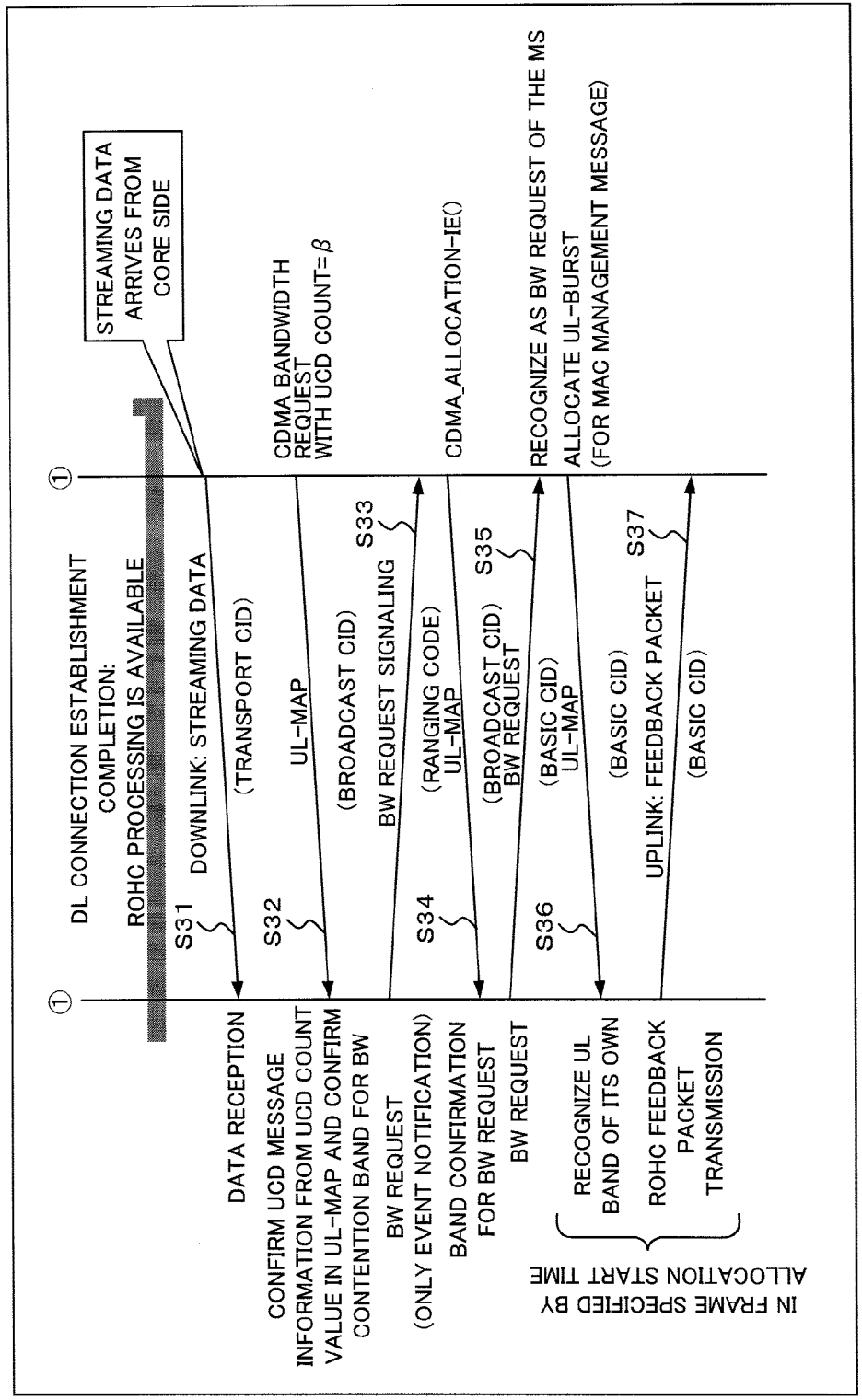
FIG. 5B is a sequence diagram for describing an operation of the system depicted in FIG. 1.

Referring to FIG. 5A and FIG. 5B, a description will be made hereafter of a sequence of transmitting user data (for example, streaming data) from the BS 1 to the MS 2 on the assumption that the above described operation is executed in the BS 1. In this instance, the notational system used in these FIG. 5A and FIG. 5B is in conformity with the one used in FIG. 6A through FIG. 6C. Further, the numbers (1) through (10) which will be used in the following description correspond to the numbers (1) through (10) which indicate the sequence order of processes performed in the BS 1 of FIG. 1.

First of all, as illustrated in FIG. 5A, when a DL user data connection establishment request is sent from the core network end to the BS 1, DL DSA processing is performed between the BS 1 and the MS 2 similarly to the sequence already described with reference to FIG. 6A (step S21 through step S30).

In more details, when user data destined to the MS 2 arrives from the core network such as an IP network and an ATM network, the BS 1 performs the following processes. A DL generation request is transmitted from the core network transmitter 11 to the MAC layer processor 12 (1) and the MAC layer processor 12 (MAC management message analyzer 12A) then detects the DL generation request (2).

When recognizing the detection of the DL generation request, the service flow controller 14 responds to the MAC layer processor 12 (MAC management message analyzer 121A) as to generation of the DSA-REQ message (3). In response to this, the MAC management message analyzer 12A instructs the DL frame organizer 12G to generate and send the DSA-REQ message (CID=Basic CID control-system message) (4). In this manner, the DSA-REQ message is sent to the MS 2.

Upon reception of the DSA-REQ message, the MS 2 requests the BS 1 to allocate a DL band width (BW: Band Width), with a DL band width request message (control-system message) by using the contention region (band width) (issues of BW request signaling).

That is, in the MS 2, the MAC layer processor 22 processes the received DSA-REQ message by way of the DL frame analyzer 22A, the PDU analyzer 22B, and the DL control-system message processor 22C, and generates the control-system message (DL band width request message) corresponding to the result of the processing, and then sends the thus generated control-system message to the BS 1 by way of the UL control-system message processor 22G and the UL frame organizer 22H.

In this instance, in the present example, also, the "contention region" is identified by means of confirming the contents (message information) of the UCD message which is cyclically issued (broadcasted) from the BS 1 based on the UCD (Uplink Channel Descriptor) count value (β) in the MAP information (UL-MAP) broadcasted from the BS 1.

Next, when normally receiving the BW request signaling, the BS 1 allocates a CDMA code (ranging code=a random value of 1 through 256) which identifies the MS 2 and parameters (information elements: IE) such as information relating to a UL band width (UL burst), which parameters are used for the MS 2 to make a band width request (control-system message), to the MS 2 with UL-MAP, and then permits transmission of the UL band width request message of the MS 2 (broadcasts a CDMA_Allocation-IE message).

That is, in the BS 1, the MAC layer processor 12 processes the BW request signaling by way of the UL frame analyzer 12B, the feedback detection CRC processor 12C, and the MAC management message analyzer 12A, and generates the CDMA_Allocation-IE message as the control-system message corresponding to the processing result and then sends the generated message to the MS 2.

Upon receiving the CDMA_Allocation-IE message (band width request permission), the MS 2 sends a band request message and a DSA response (DSA-RSP) message, which are control-system messages (CID=Basic CID), to the BS 1 by use of the allocated UL burst (that is, the transmission region of a control-system message).

That is, in the MS 2, the MAC layer processor 22 processes the CDMA_Allocation-IE message by way of the DL frame analyzer 22A, the PDU analyzer 22B, and the DL control-system message processor 22C, and generates the bandwidth request message and the DSA response (DSA-RSP) message, as the control message corresponding to the processing result, by way of the UL control-system message processor 22G and the UL frame organizer 22H, and then sends the generated messages to the BS 1.

When normally receiving the DSA-RSP message, the BS 1 sends the DSA acknowledgement (DSA-ACK) message, as a reply to the DSA-RSP message, to the MS 2. That is, in the BS 1, the MAC layer processor 12 detects the DSA-RSP message by means of the processing performed by the UL frame analyzer 12B and the feedback detection CRC processor 12C (5), and generates a DSA-RSP message, as the response (control-system message) corresponding to the subject message, by way of the MAC management message analyzer 12A, and then sends the generated DSA-RSP message to the BS 1 (6).

Further, upon normal reception of the DSA-RSP message by the MS 2, the DL DSA processing is completed, a DL user data connection being thereby established. Here, in the sequence already described with reference to FIG. 6B, the UL DSA processing is performed (step S111 through step S119) for use in feedback performed at the time of the ROHC processing for establishing the UL connection (feedback connection). The present example, however, provides the ROHC processing function for the MAC layer and performs ROHC feedback by use of the band width for control, so that the UL DSA processing function may be eliminated.

Accordingly, as illustrated in FIG. 5B, hereafter, when user data (streaming data) arrives at the BS 1 from the core network end (7), the GMH including the CID=Transport CID, indicating that the arrived data is user data, is given to the data by the BS 1 as the data passes through the classifier 12E, the PDU generator 12F, and the DL frame organizer 12G, and the GMH-added data is transmitted to the MS 2 through the DL connection established in such a manner as is described above (step S31).

On the other hand, in the MS 2, when the UL user data processor 22F detects and processes the ROHC packet which is generated by the ROHC processor 12F of the BS 1 and sent by the DL frame organizer 12G in the form of a DL frame during reception of the user data through the DL connection, the ROHC feedback processor 22E generates a feedback packet (ROHC-ACK/NACK) indicating the normal/abnormal reception of the ROHC packet.

That is, as indicated in FIG. 2, the ROHC feedback processor 22E sets the Basic CID, indicating that the packet carries no user data but a control-system message, to the CID field of the MAC header, and masks the management type field to the unused "0xFF", and stores the ROHC feedback packet in the payload field, and also, adds the result obtained by performing a CRC arithmetic operation of each of the fields except the MAC header, thereby generating a feedback packet. At that time, as indicated in FIG. 3, it is preferable that the CID (Transport CID) of the DL user data connection is given to the payload filed.

Then, in order to send the generated feedback packet to the BS 1 with a UL burst through the UL frame organizer 22H, the MS 2 requests allocation of a UL band width by use of the UL contention area specified by the UL-MAP from the BS 1, which then allocates the UL band width (UL burst) with the UL-MAP in response to the request from the MS 2 (step S32 through step S36). This makes it possible for the MS 2 to send the feedback packet to the BS 1 by use of the allocated UL burst (step S37).

Figure 4:
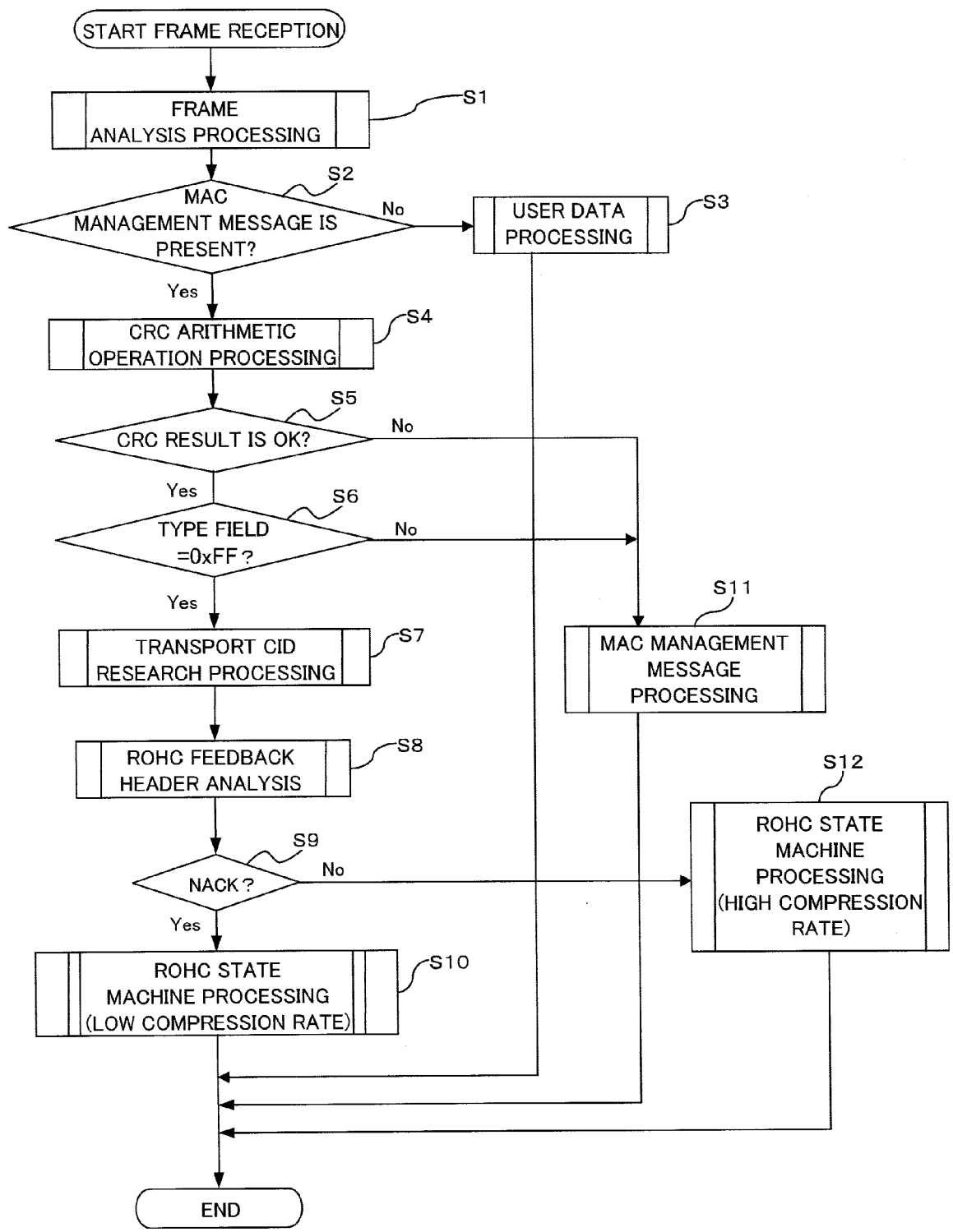
FIG. 4 is a flowchart for describing an operation with an attention paid to a wireless base station (BS) in the system depicted in FIG. 1.

On the other hand, the BS 1 operates in obedience to the flowchart illustrated in FIG. 4. This makes it possible for the MAC layer processor 12 to receive and detect the feedback packet sent from the MS 2. That is, when it is detected that the Basic CID is used in the received PDU by the UL frame analyzer 12B, the feedback detection CRC processor 12C, and the feedback header analyzer 12D and also when the CRC arithmetic operation result is "OK" (it is more preferable that the detection condition includes the fact that the management type field is masked for improving the detection accuracy), the subject PDU is decided to be a feedback packet (9).

Further, the feedback packet is transmitted to the ROHC processor 12F, which then executes state machine processing of the ROHC in accordance with ACK/NACK (10) of the feedback packet, thereby changing or maintaining the header compression ratio of the DL user data (PDU).

As described above, the present embodiment makes it possible to send a response (feedback packet) to the ROHC packet received from the BS 1 through the user data DL connection (that is, the DL data channel) by use of the UL connection (that is, control channel) for a control-system message, not the one for user data. As a result, it may become not to establish a UL user data connection only for a feedback packet to secure the UL band width, and the BS 1 does not generate an additional UL service flow due to the DSA processing. Further, the MS 2 may not to process needless DSA.

(1) That is, partly since the MAC layer of the MS 2 is provided with an ROHC processing function to realize the processing of adding a feedback packet, and partly since the MAC layer of the BS 1 is provided with the ROHC processing function to realize unique evaluation processing of a feedback packet, it is possible to increase the velocity of the ROHC feedback processing.

(2) Further, since the CRC arithmetic operation function is provided in the ROHC processing function of the MAC layer of the BS 1 to realize the processing in which an arithmetic operation of the CRC results added to the UL packet having been feedback, defining a new type of information in addition to the management message type information defined under the WiMAX standard is eliminated in confirmation of the ROHC feedback packet.

(3) Yet further, since the CRC arithmetic operation function is provided in the ROHC processing function of the MAC layer of the MS 2 to realize an arithmetic operation performed to the ROHC-specified user packet which is received in downlink and then subjected to feedback packet generation from the user packet state, and also to perform the processing in which the packet added thereto with the CRC result in uplink as an ROHC feedback packet, it is possible to notify that the transmitted packet is a ROHC feedback packet.

(4) Still further, since a CRC arithmetic operation function is provided in the ROHC processing function of the MAC layer of the BS 1 to realize the processing which further enables distinguishing from the message type, it is possible to correctly and assuredly separate the ROHC feedback packet from the control-system message under the original WiMAX standard.

(5) Furthermore, since a database in which the Transport CIDs and the Basic CIDs are associated with one another is provided for the MAC layer of the BS 1 to confirm the Basic CID in a packet having been feedback, it is possible to confirm the Transport CID associated with the Basic CID (that is, downlink data channel).

(6) Further, since the MAC layer of the BS 1 has the functions of classifying the user data received from the core network, and changing the ROHC state from the feedback packet, and transmitting the packet subjected to the corresponding processing (header compression processing), it is possible to perform feedback preparation processing.

(7) Yet further, since the management message type field of the feedback packet is set to 0xFF so as to mask the original message type under the WiMAX standard, it is possible to make a stable decision on the receiver end (BS).

(8) Still further, not only the Transport CID inserted into the feedback packet makes it possible to perform table searching based on the Basic CID, but also the CID obtained in a simple manner make it possible to easily decide of which service flow (user data) the feedback packet is.

(9) Furthermore, partly since the CRC arithmetic operation is performed in a range from the management message type field (0xFF region) to the payload field (feedback packet), and partly since the obtained result is added, it is possible to avoid effects from being given to the header field (GMH).

From the above, it is possible to obtain at least any of the effects in terms of time, band width, and implementation.

(Effect in Terms of Time)

For example, on the assumption that unilateral communications to a network AAA (Authentication, Authorization, and Accounting) server is 5 ms, and that the DSA (unilateral)

processing costs about 12 ms, if 512 MSs 2 are connected to a single BS 1 at the same time, the completion of the connections of all the MSs 2 costs twice 12×512=6144 ms (for UL and DL), that is, about 12 seconds. However, the present embodiment makes it possible to complete the connections in half of the above mentioned time duration, that is, about 6 seconds.

(Effect in Terms of Band Width)

Further, in a case where the whole band width available for transmission of user data is 20 Mbps (except the band width for control messages) and 512 MSs 2 are connected to a single BS 2, provided that 1200-byte DL data of 50 Kbps flows, packets of (50×1024/8) bytes/1200 bytes=5.3 (packets/second)

resultantly flow per second. When calculating all the band widths of the whole of 512 MSs 2 on the assumption that a feedback packet (assumed to be about 80 bytes) is generated for each of the packets, the following result is obtained:

5.3 (packets)×80 (bytes)×512×8=1.7 Mbps

This becomes the band width used for UL. Here, generally speaking, since the band width for control messages is secured, the other band width may be allocated. As a result, the user band width of 20 Mbps is decreased to 20−1.7=18.3 Mbps. In contrast to this, according to the above described preferred embodiment, the 1.7 Mbps band width uses the band width for control messages, so that it becomes possible to use the whole of 20 Mbps in user data transmission.

(Effect in Terms of Implementation)

Further, in the already existing mobile WiMAX system, in a case where the ROHC processing is applied thereto, the DL user data connections in the upper layer of the MAC layer are associated with the UL user data connections. Thus, provided that data to be stored as context in each device of the MS and the BS is DL Transport CID=32 (bits)
UL Transport CID=32 (bits)
Basic CID=32 (bits), the BS requests 32 (bits)×3×512 (the number of MSs)=49,152 (bits), at minimum, that is, a memory of about 6 KB (in this instance, inevitably, UL context is originally requested, but it is omitted here). In contrast to this, according to the above described preferred embodiment, partly since it is possible to eliminate the UL Transport CID, and partly since already existing CID (Basic CID) is also used in transmission of feedback packets, the CID for user data is not increased. Accordingly, it becomes possible to decrease the size of the memory down to 32 (bits)×2×512 (the number of MSs)=32,768 (bits).

Yet further, since no UL service flow is generated, it may not register and manage the UL band widths in the BS 1, and the database for band width management may not use. Still further, registration to the classification processing performed on the BS 1 is capable of being eliminated, so that easy management is realized.

The above described embodiments realize at least any of the effects and benefits described below.

(1) Since the wireless terminal sends the response data in response to the control data relating to the processing belonging to the second layer received from the wireless base station through the downlink data channel by use of the control channel already established at the time of sending the response data, establishing an uplink data channel only for the response data is eliminated, so that the wireless base station does not generate an additional uplink service flow. In addition, a wireless terminal may not to perform redundant processing.

(2) Partly since the wireless terminal is capable of adding the CRC arithmetic operation result to the response data, and partly since the wireless base station performs a CRC arithmetic processing to the received data, thereby making it possible to detect the response data, it is possible to make a confirmation that the response data relates to the processing belonging to the upper layer (second layer) without defining a new type of information in addition to the type information of the control-system message already defined under the WiMAX standard.

(3) Since the wireless base station is capable of confirming detection of the response data by confirming other information than the type information already defined as to the existing control data, which is added to the payload field of the response data, it is possible to detect the response data and to improve the detection accuracy of the response data and to resultantly realize stable decisions.

(4) Further, since the subject of the CRC arithmetic operation is made to be a part or all of the payload field except the header field, it is possible to avoid giving effects to the information in the header field.

(5) Yet further, since the wireless base station is capable of managing the association relationship between the downlink data channel and the control channel based on the identification information of the downlink data channel contained in the response data, it is possible to suppress increase in memory amount used for the management and also complication of the management.

As detailed above, since the embodiments make it possible not to establish a UL data channel only for feedback packets sent to the BS in the ROHC processing belonging to the upper layer of the MAC layer, it becomes possible to realize effective use of wireless resources and easier management. The embodiments are thus considered to be significantly useful in the field of wireless communications technology.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A wireless communications controlling method for use in a wireless communications system which performs communications by establishing a downlink data channel with a control channel, as processing belonging to a first layer, between a wireless base station and a wireless terminal, the wireless communications controlling method comprising:

sending, by the wireless base station, control data relating to processing belonging to a second layer, which is an upper layer of the first layer, through the downlink data channel, sending, by the wireless terminal, response data in response to the control data to the wireless base station through the control channel, upon reception of the control data through the downlink data channel, detecting, by the wireless base station, the response data from the received data received through the control channel; and controlling, by the wireless base station, the processing belonging to the second layer based on the response data.

2. The wireless communications controlling method according to claim 1, comprising:

sending, by the wireless terminal, the response data to which is added a result obtained by performing a CRC arithmetic operation to the response data, through the control channel, and detecting, by the wireless base station, the response data by performing a CRC arithmetic operation to the received data received through the control channel.

3. The wireless communications controlling method according to claim 2, comprising:

adding, by the wireless terminal, other information than classification information, already defined with respect to existing control data, to a payload field of the response data, and confirming, by the wireless base station, the detection of the response data by confirming the information.

4. The wireless communications controlling method according to claim 2, wherein a subject to which the CRC arithmetic operation is performed is a part or all of the payload field expect for a header field.

5. The wireless communications controlling method according to claim 1, comprising:

sending, by the wireless terminal, the response data which includes identification information of the downlink channel, and managing, by the wireless base station, an association relationship between the downlink data channel and the control channel based on identification information of the downlink data channel included in the response data.

6. The wireless communications controlling method according to claim 1, wherein the first layer is a media access control (MAC) layer, and wherein the second layer is a convergence sub-layer.

7. A wireless base station which performs communications by establishing a downlink data channel with a control channel, as processing belonging to a first layer, between the wireless base station and a wireless terminal, the wireless base station comprising:

a transmitter that transmits control data relating to processing belonging to a second layer, which is an upper layer of the first layer, through the downlink data channel;

a detector that detects response data in response to the control data from the received data through the control channel; and a controller that controls the processing belonging to the second layer based on the response data detected by the detector.

8. The wireless base station according to claim 7, wherein the detector comprises: a CRC processor that detects the response data, to which is added a result obtained by performing a CRC arithmetic operation to the response data, from the control channel by performing the CRC arithmetic operation to the received data received through the control channel.

9. The wireless base station according to claim 8, wherein the detector comprises: a detection protector that confirms detection of the response data by evaluating whether or not other information than classification information, already defined with respect to existing control data, is added to a payload field of the response data, and thereby confirms the detection of the response data.

10. The wireless base station according to claim 8, wherein a subject to which the CRC arithmetic operation is performed by the CRC processor is a part or all of the payload field expect for a header field.

11. The wireless base station according to claim 7, wherein the controller manages an association relationship between the downlink data channel and the control channel based on identification information of the downlink data channel included in the response data.

12. A wireless terminal which performs communications by establishing a downlink data channel with a control channel, as processing belonging to a first layer, between the wireless terminal and a wireless base station, the wireless terminal comprising:

a receiver that receives control data relating to processing belonging to a second layer, which is an upper layer of the first layer, through the downlink data channel; and a transmitter that transmits response data in response to the control data through the control channel upon reception of the control data by the receiver.

13. The wireless terminal according to claim 12, wherein the transmitter comprises: a CRC processor that adds a result obtained by performing a CRC arithmetic operation to the response data, to make it possible to detect the response data by performing a CRC arithmetic operation to the received data received through the control channel.

14. The wireless terminal according to claim 13, wherein the transmitter further comprises: a classification information setting unit which sets other information than classification information, already defined with respect to existing control data, to a payload field of the response data.

15. The wireless terminal according to claim 13, wherein a subject of the CRC arithmetic operation performed by the CRC processor is a part or all of the payload field expect for a header field.

16. The wireless terminal according to claim 12, wherein the transmitter further comprising: a downlink data channel identification information adding unit which sends the response data that includes identification information through the downlink data channel.

* * * * *